United States Patent
Wiebesick

(10) Patent No.: US 6,462,825 B1
(45) Date of Patent: Oct. 8, 2002

(54) NONVOLATILE DIGITAL POTENTIOMETER TRIMMED RING LASER GYROSCOPE

(75) Inventor: Jason E. Wiebesick, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/507,962

(22) Filed: Feb. 22, 2000

(51) Int. Cl.[7] .............................................. G01C 19/70
(52) U.S. Cl. ...................................................... 356/475
(58) Field of Search ................................. 356/459, 460, 356/471, 472, 473, 474, 475

(56) References Cited

U.S. PATENT DOCUMENTS 5,076,694 A * 12/1991 Aronowitz .................. 345/459
5,116,132 A * 5/1992 Mitchell et al. ............. 356/467
5,379,114 A * 1/1995 Dorsman .................... 356/459

* cited by examiner

Primary Examiner—Samuel A. Turner
(74) Attorney, Agent, or Firm—Dennis C. Bremer

(57) ABSTRACT

A ring laser gyroscope (RLG) is configured with control circuits that are capable of automatic calibration. The RLG generates two laser beams in opposite directions around a closed loop path to determine angular rotation of the RLG. The laser beams propagate in a laser gain medium, and a laser intensity monitor circuit is operatively connected to the laser gain medium to monitor an intensity of the laser beams propagating in the laser gain medium. A dithering circuit is provided, including a dithering motor for mechanically oscillating the RLG at a controlled frequency and dither angle. A gain circuit is operatively connected to a detector array of the RLG to amplify a detector signal therefrom. According to the present invention, an automatically variable resistance is provided to calibrate the laser intensity monitor circuit of the RLG, to control the dither angle at which the dithering motor mechanically oscillates the RLG, and/or to calibrate the gain circuit of the RLG. In one embodiment, the automatically variable resistance(s) is provided by one or more digital potentiometers connected to the relevant control circuitry.

9 Claims, 3 Drawing Sheets

| FIG. 2-1 |
|---|
| FIG. 2-2 |

NONVOLATILE DIGITAL POTENTIOMETER TRIMMED RING LASER GYROSCOPE

BACKGROUND OF THE INVENTION

The present invention relates to a ring laser gyroscope, and more particularly to an improved apparatus and method for calibrating and testing a ring laser gyroscope utilizing nonvolatile digital potentiometers to trim the control circuits of the ring laser gyroscope.

Ring laser gyroscope (RLG) devices for measuring angular rotation rates are known in the art. In these devices, two laser beams are generated in opposite directions around a closed loop path about the axis of rotation of the device. Rotation of the apparatus causes the effective path length for the two beams to change, thus producing a frequency difference between the two beams since the frequency of oscillation of the laser beams is dependent upon the length of the lasing path. The frequency difference between the beams causes a phase shift between the beams that changes at a rate proportional to the frequency difference. The interaction of the beams produces an interference fringe pattern which is observed to move with a velocity proportional to the rate of angular rotation of the device about the axis.

In order to ensure accurate operation of the ring laser gyroscope, a number of initial calibration steps must be performed. In particular, there are three calibrations that are especially important —the laser intensity monitor (LIM), the dithering motor, and the SIN A and SIN B gain circuits of the device. The LIM senses the output intensity of the laser utilized in the ring laser gyroscope, so as to provide a signal indicative of the relative health and remaining life of the laser. The dithering motor of the RLG is a mechanical device that oscillates the RLG at a predetermined frequency and with a predetermined range of angular rotation, known as a dither angle. Dithering of the RLG prevents an undesirable phenomenon known to those skilled in the art as "lock-in" which hinders the operation of the RLG. The dither angle is calibrated specifically for each individual RLG to ensure proper operation. The operation of the RLG may be diagnostically evaluated by charting certain characteristics of the laser output in a lissajous pattern, as is known in the art. The shape of the lissajous pattern provides an indication of the phasing of the lasers utilized in the RLG as well as the general health of the lasers, and is best viewed when the SIN A and SIN B gain circuits are adjusted to reduce the gain of the circuit below the level of clamping of the signal producing the lissajous pattern.

All of the calibrations described above are labor-intensive processes that require a skilled technician to manually adjust certain components of the RLG to perform the required calibration. These manual adjustments typically necessitate breaking of the RLG's seal, which then must be re-done after calibration with considerable expenditure of time and money. It would therefore be a significant improvement in the art to provide a mechanism for performing the required calibrations of ring laser gyroscopes automatically.

BRIEF SUMMARY OF THE INVENTION

The present invention is a ring laser gyroscope (RLG) having control circuits that are capable of automatic calibration. The RLG generates two laser beams in opposite directions around a closed loop path to determine angular rotation of the RLG. The laser beams propagate in a laser gain medium, and a laser intensity monitor circuit is operatively connected to the laser gain medium to monitor an intensity of the laser beams propagating in the laser gain medium. A dithering circuit is provided, including a dithering motor for mechanically oscillating the RLG at a controlled frequency and dither angle. A gain circuit is operatively connected to a detector array of the RLG to amplify a detector signal therefrom. According to the present invention, an automatically variable resistance is provided to calibrate the laser intensity monitor circuit of the RLG, to control the dither angle at which the dithering motor mechanically oscillates the RLG, and/or to calibrate the gain circuit of the RLG. In one embodiment, the automatically variable resistance(s) is provided by one or more digital potentiometers connected to the relevant control circuitry.

DETAILED DESCRIPTION

Figure 1:
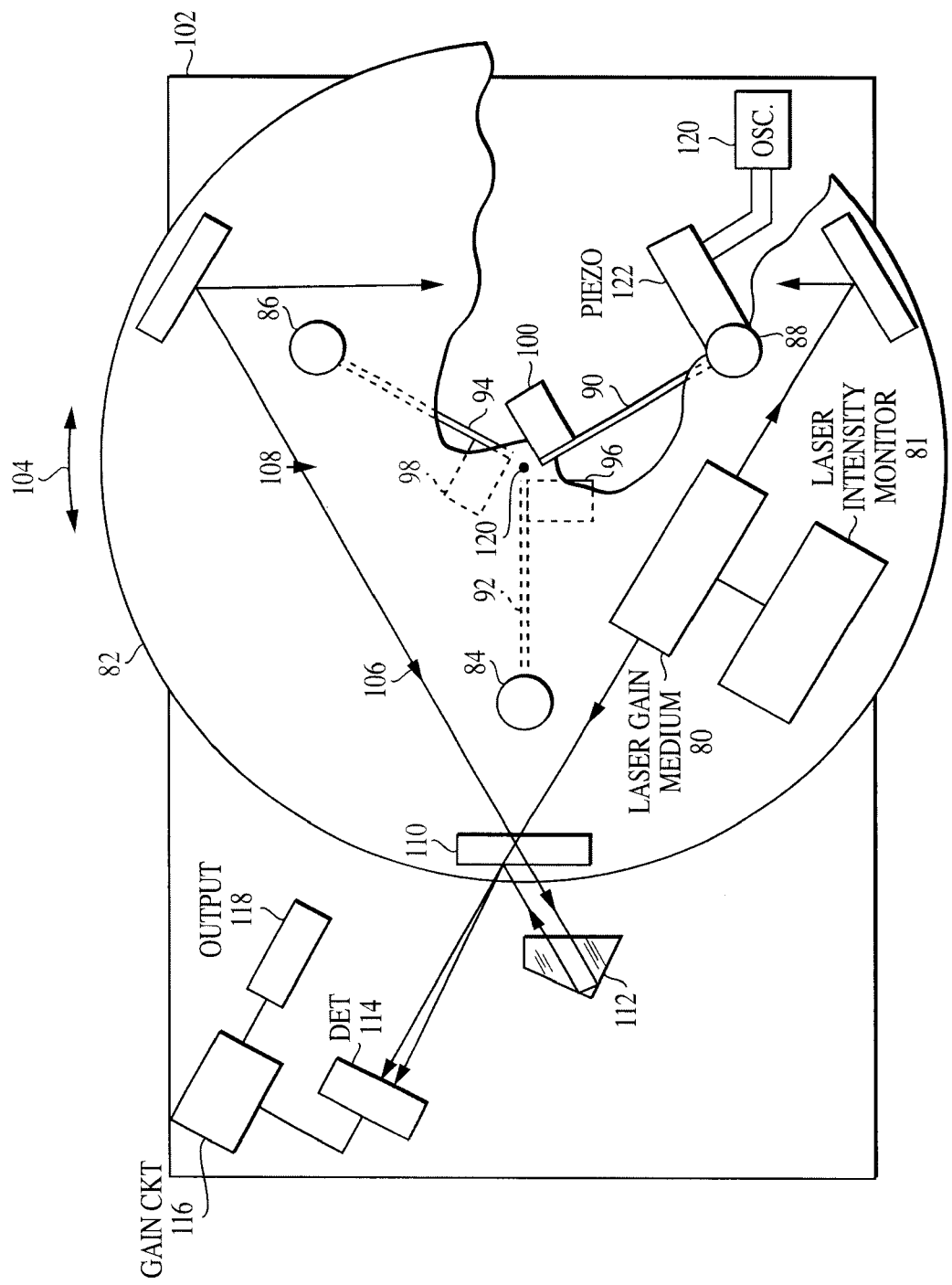
FIG. 1 is a partially broken away diagram illustrating a ring laser gyroscope as is known in the art.

FIG. 1 is a partially broken away diagram illustrating a ring laser gyroscope (RLG) as is known in the art. Laser gain medium 80 is shown supported on a rotatable base 82 which is mounted by means of three pegs 84, 86 and 88 to three leaf springs 90, 92 and 94 which are in turn mounted to three mounting blocks 96, 98 and 100. Blocks 96, 98 and 100 are securely fixed to base 102 so that rotatable base 82 may vibrate back and forth as indicated by arrow 104. Laser intensity monitor 81 is operatively connected to monitor the beam intensity in laser gain medium 80, as the medium amplifies and generates laser light about a closed triangular loop in the direction indicated by arrows 106 and 108 in a manner known a in the art of RLGs. At a partially transparent corner mirror 110 the two beams partially pass through and are combined by an internally reflecting right angle prism 112 and projected onto a detector array 114. The slight difference in angle between the beams, based on the rotation rate of the RLG, causes a fringe pattern to be formed on detector array 114 which is indicative of the rotation of the RLG. Gain circuit 116 is operatively connected to detector array 114 to amplify the detector signal in a manner suitable for output 118, in condition for analysis to determine the rotation of the RLG in a manner known in the art.

In order to oscillate moving base 82 in a circular or rotational fashion, oscillator 120 is shown driving a piezoelectric element 122 so as to cause periodical vibration, with piezoelectric element 122 being attached to the end of leaf spring 90. The resultant back and forth motion of leaf spring 90 causes base 82 to rotationally oscillate, which helps to avoid the "lock-in" effect associated with operation of the RLG, as is known in the art. The extent of rotation is known as the "dither angle" of the RLG, which is controlled by the driving signal provided to piezoelectric element 122 by oscillator 120.

Figures 1, 2:
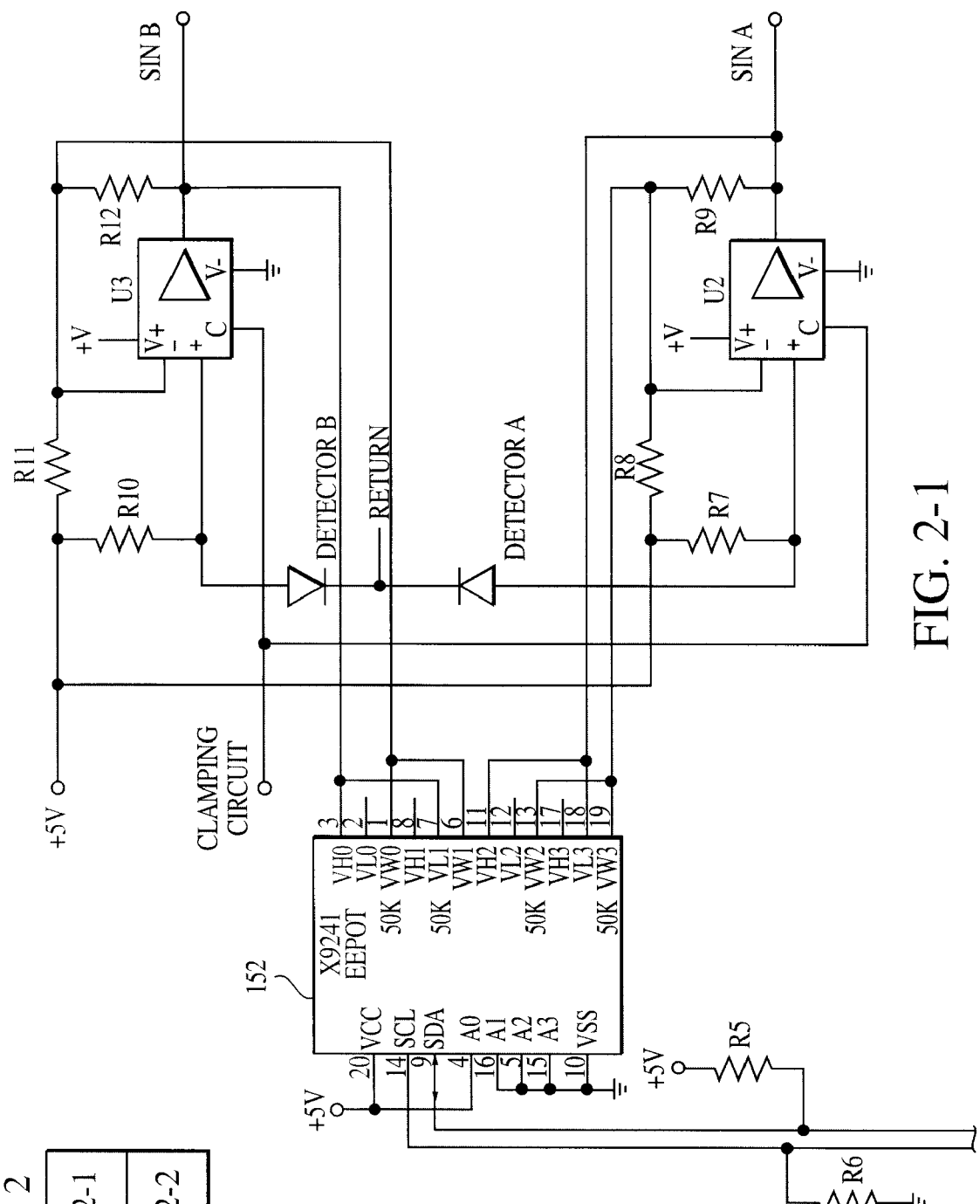
FIG. 2 is a schematic diagram of the portions of a ring laser gyroscope utilizing digital potentiometers for automatic calibration according to the present invention.
Figure 2:
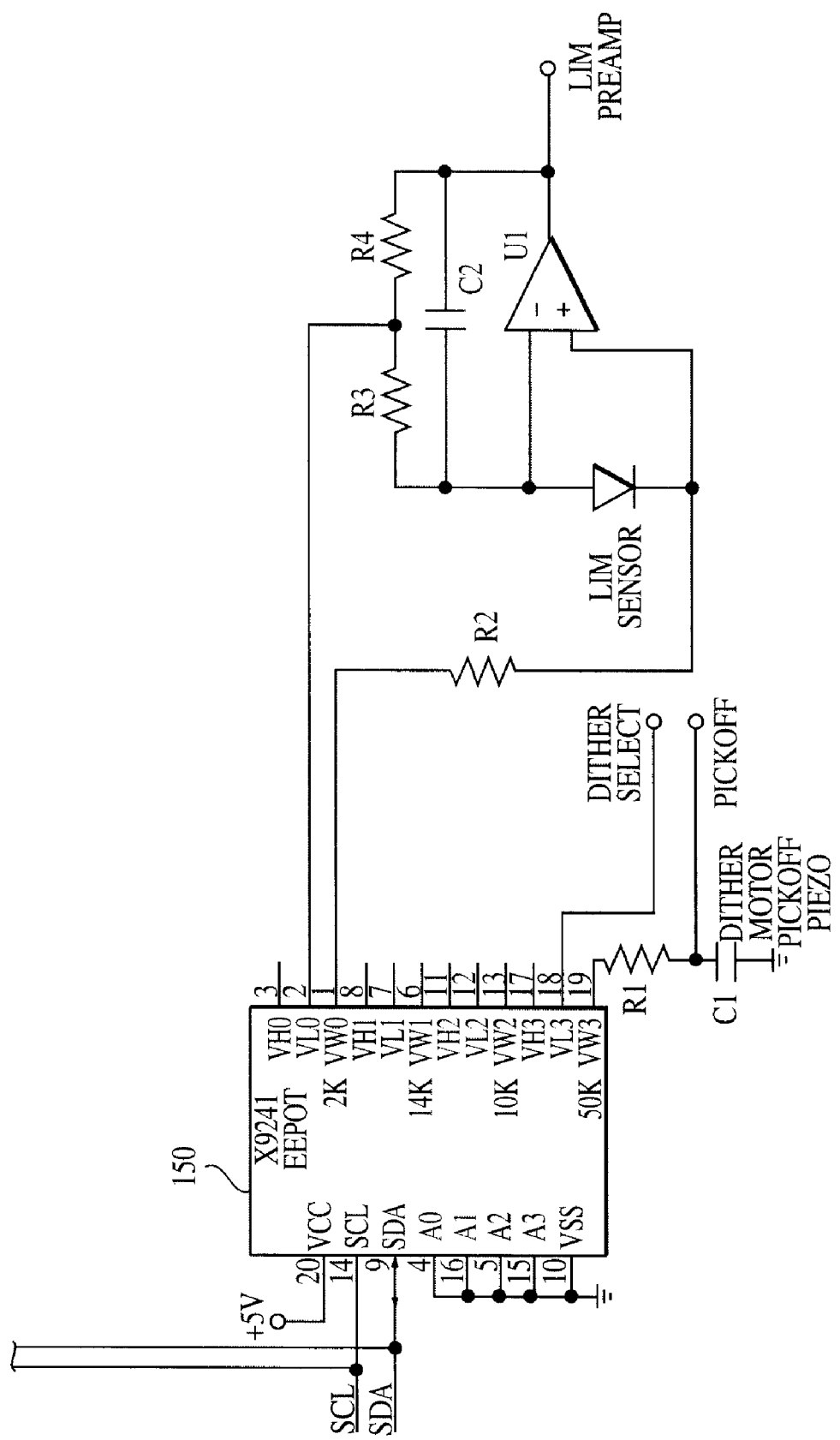

FIG. 2 is a schematic diagram of the portions of a RLG utilizing digital potentiometers for automatic calibration according to the present invention. The digital potentiometers are implemented to calibrate the laser intensity monitor, the dithering motor, and the gain circuit of the RLG, as will be described in more detail below.

1. Laser Intensity Monitor

A digital potentiometer is utilized according to the present invention to calibrate the laser intensity monitor (LIM) of a RLG system. As shown in FIG. 2, digital potentiometer chip 150 is provided to present an automatically variable resistance to the LIM circuit. In the embodiment shown in FIG. 2, digital potentiometer chip 150 is a X9241 Quad E²POT Nonvolatile Digital Potentiometer manufactured by Xicor, Inc. The LIM circuit includes operational amplifier U1 having an output connected to the LIM preamplifier, with capacitor C2 and series resistors R3 and R4 connected in parallel between the output and the inverting input of operational amplifier U1. The LIM sensor is connected between the inverting input and the non-inverting input of operational amplifier U1. The 2kilo-Ohm (kΩ) potentiometer pins of potentiometer chip 150 are utilized with the LIM circuit, with the VLO pin of potentiometer chip 150 being connected between resistors R3 and R4, and the VWO pin of potentiometer chip 150 being connected through resistor R2 to the non-inverting input of operational amplifier U1.

The SCL and SDA input lines to digital potentiometer chip 150 are manipulated by a computer program with the proper signals as described by the Xicor® Inc. X9241 data sheets to step up or step down the resistance of the 2 kΩ potentiometer output pins VLO and VWO. Proper selection of the resistance will result in the LIM monitor being adjusted to the nominal calibration level recorded in DC volts. An external computer allows for automatic calibration through the gyroscope interface connector to the X9241 potentiometer, and the potentiometer allows for high resolution resistance stepping. Both combined together allow for faster and more accurate calibration of the LIM circuit with the gyroscope either open or sealed.

2. Dithering Motor

A digital potentiometer is also utilized according to the present invention to calibrate the dithering motor of the RLG system. As shown in FIG. 2, digital potentiometer chip 150 is provided to present an automatically variable resistance to the dithering motor circuit. The dithering circuit includes a dither select terminal and a pickoff terminal, with the dithering motor pickoff piezoelectric element being connected between the pickoff terminal and a reference voltage level such as ground. The 50 kΩ potentiometer pins of potentiometer chip 150 are utilized with the dithering motor circuit, with the VL3 pin of potentiometer chip 150 being connected to the dither select terminal and the VW3 pin of potentiometer chip 150 being connected through resistor RI to the pickoff terminal.

The SCL and SDA input lines to digital potentiometer chip 150 are manipulated by a computer program with the proper signals as described by the Xicore® Inc. X9241 data sheets to step up or step down the resistance of the 50 kΩ potentiometer output pins VL3 and VW3. Proper selection of the resistance will result in the dither angle being adjusted to the nominal calibration level recorded in arc seconds peak to peak. An external computer allows for automatic calibration through the gyroscope interface connector to the X9241 potentiometer, and the potentiometer allows for high resolution resistance stepping. Both combined together allow for simplified and more accurate calibration of the dither angle control loop circuit. Dither angle is calibrated with the gyroscope cover off since it is necessary to physically take an angle measurement with the appropriate test equipment.

3. Gain Circuit

A digital potentiometer is also utilized according to the present invention to calibrate the gain circuit of the RLG system. As shown in FIG. 2, digital potentiometer chip 152 is provided to present an automatically variable resistance to the gain circuit. In the embodiment shown in FIG. 2, digital potentiometer chip 152 is a X9241 Quad E²POT Nonvolatile Digital Potentiometer manufactured by Xicor,® Inc. The gain circuit includes amplifier U2 having an output connected to the SIN A signal of the processed detector output, and includes amplifier U3 having an output connected to the SIN B signal of the processed detector output. Resistor R9 is connected between the output pin of amplifier U2 and the inverting input of amplifier U2. Resistor R7 is connected between a positive voltage level (such as+5 volts) and the non-inverting input of amplifier U2, and resistor R8 is connected between the positive voltage level and the inverting input of amplifier U2. Detector A is connected between the non-inverting input of amplifier U2 and a return node. Resistor R12 is connected between the output pin of amplifier U3 and the inverting input of amplifier U3. Resistor RIO is connected between the positive voltage level and the non-inverting input of amplifier U3, and resistor R11 is connected between the positive voltage level and the inverting input of amplifier U3. Detector B is connected between the non-inverting input of amplifier U3 and the return node.

Digital potentiometer chip 152 includes four 50 kΩ potentiometer pin sets, with the VHO and VL1 pins being tied together and connected to the output of amplifier U3 and the VWO and VW1 pins being tied together and connected to the inverting input of amplifier U3. Thus, the first and second potentiometers in digital potentiometer chip 152 are cascaded together to provide a larger top-end resistance to the gain circuit. Similarly, the VH2 and VL3 pins are tied together and connected to the output of amplifier U2, and the VW2 and VW3 pins are tied together and connected to the inverting input of amplifier U2, thereby cascading together the third and fourth potentiometers of digital potentiometer chip 152 to provide a larger top-end resistance to the gain circuit.

The gain circuit is connected to a clamping circuit that operates to clamp the SIN A and SIN B outputs at a predetermined level in order to preserve the life of the laser utilized in the RLG system. Specifically, the clamping circuit is connected to amplifiers U2 and U3 to clamp the amplitude of the sine waves generated thereby at the predetermined level. However, when performing a calibration to qualitatively test the RLG for proper operation of the laser and alignment of detectors A and B, it is important that the sine waves be analyzed without any clamping effects so that the true shape characteristics of the sine waves may be properly evaluated. Thus, the gain circuit must be adjustable to a level below the predetermined level where clamping will occur. This is achieved in the present invention by the provision of digital potentiometer chip 152, which provides a variable resistance between the output and inverting inputs of amplifiers U2 and U3 to adjust the gain of those amplifiers, thereby enabling a selective reduction in gain to occur when a calibration level of the SIN A and SIN B outputs is appropriate.

The SCL and SDA input lines to digital potentiometer chip 152 are manipulated by a computer program with the proper signals as described by the Xicor® Inc. X9241 data sheets to step up or step down the resistance of the cascaded 50 kΩ potentiometer pairs. The cascaded 50 kΩ pairs are equally stepped so as to maintain equal resistance on their associated output pins (VHO, VWO, VL1, VW1, and VH2, VW2, VL3, VW3) and thus maintain equal gain in each amplifier circuit involving U2 and U3. Proper selection of the resistance will result in the SIN A and SIN B signals at the gyroscope interface connector being adjusted to the nominal calibration level (below the clamping level) and allow for true shape characteristics to be viewed on an oscilloscope. The position of Detector A and Detector B are then physically adjusted by a trained technician to the proper position, as reflected by the shapes of the SIN A and SIN B signals displayed on the oscilloscope. Once the detectors are properly positioned, an external computer is then commanded to step the resistance back up on digital potentiometer chip 152 to the required level for the normal operation mode in each gain circuit involving U2 and U3. The external computer allows for automatic calibration through the gyroscope interface connector to potentiometer chip 152, and the potentiometer allows for high resolution resistance stepping. Both combined together allow for simplified and more accurate calibration of the gain circuits. Detector A and Detector B are calibrated with the gyroscope cover off since it is necessary to physically adjust the positions of the detectors.

As a result of the implementation of the digital potentiometers of the present invention, several advantages in the calibration process of the RLG system are achieved. The resistances provided by the digital potentiometers are automatically variable by data signals connected on a dual wire serial interface. Therefore, calibrations may be performed under computer control rather than by manual adjustment, which substantially improves the accuracy, consistency and efficiency of the calibrations. In addition, the electronic variability of the resistances allows calibrations to occur without having to contaminate the seal of the RLG unit, which is particularly advantageous when performing calibrations on a finished RLG such as in the situation of a returned unit or as a part of a post-manufacture test procedure. The need for manually soldered resistors can be eliminated, which reduces labor and the need to stock large quantities of resistors for calibrations. Many other advantages of the digital potentiometer trimmed RLG according to the present invention will be apparent to those skilled in the art.

Although the present invention has been described with reference to preferred embodiments, workers skilled in the art will recognize that changes may be made in form and detail without departing from the spirit and scope of the invention.

I claim:

1. A ring laser gyroscope generating two laser beams in opposite directions around a closed loop path, the two laser beams being received by a detector array to determine angular rotation of the ring laser gyroscope, comprising:

control circuitry for monitoring an intensity of the laser beams propagating around the closed loop path, operating a dithering motor to mechanically oscillate the ring laser gyroscope at a controlled frequency and dither angle, and amplifying a signal from the detector array; and at least one digital potentiometer connected to the control circuitry to provide an automatically variable resistance to the control circuitry.

2. The ring laser gyroscope of claim 1, wherein the two laser beams propagate in a laser gain medium defining the closed loop path and the control circuitry comprises a laser intensity monitor circuit operatively connected to the laser gain medium to monitor the intensity of the laser beams propagating in the laser gain medium, a dithering circuit for operating the dithering motor to mechanically oscillate the ring laser gyroscope at the controlled frequency and dither angle, and a gain circuit operatively connected to the detector array to amplify the signal therefrom, and wherein the at least one digital potentiometer is connected to the laser intensity monitor circuit to provide a first automatically variable resistance to calibrate the laser intensity monitor circuit, connected to the dithering circuit to provide a second automatically variable resistance to control the dither angle at which the dithering motor mechanically oscillates the ring laser gyroscope, and connected to the gain circuit to provide a third autmoatically variable resistance to calibrate the gain circuit.

3. A ring laser gyroscope generating two laser beams in opposite directions around a closed loop path to determine angular rotation of the ring laser gyroscope, comprising:

a laser gain medium in which the two laser beams propagate;

a laser intensity monitor circuit operatively connected to the laser gain medium to monitor an intensity of the laser beams propagating in the laser gain medium; and means for providing an automatically variable resistance to calibrate the laser intensity monitor circuit.

4. The ring laser gyroscope of claim 3, wherein the means for providing an automatically variable resistance to calibrate the laser intensity monitor circuit comprises a digital potentiometer connected to the laser intensity monitor circuit.

5. A ring laser gyroscope generating two laser beams in opposite directions around a closed loop path to determine angular rotation of the ring laser gyroscope, comprising:

a dithering circuit including a dithering motor for mechanically oscillating the ring laser gyroscope at a controlled frequency and dither angle; and means for providing an automatically variable resistance to control the dither angle at which the dithering motor mechanically oscillates the ring laser gyroscope.

6. The ring laser gyroscope of claim 5, wherein the means for providing an automatically variable resistance to control the dither angle at which the dithering motor mechanically oscillates the ring laser gyroscope comprises a digital potentiometer connected to the dithering circuit.

7. A ring laser gyroscope generating two laser beams in opposite directions around a closed loop path, the two laser beams being received by a detector array to determine angular rotation of the ring laser gyroscope, comprising:

a gain circuit operatively connected to the detector array to amplify a detector signal therefrom; and means for providing an automatically variable resistance to calibrate the gain circuit.

8. The ring laser gyroscope of claim 7, wherein the means for providing an automatically variable resistance to calibrate the gain circuit comprises a digital potentiometer connected to the gain circuit.

9. The ring laser gyroscope of claim 7, wherein the gain circuit clamps the detector signal at a predetermined clamping amplitude in an operating mode of the ring laser gyroscope, and wherein the means for providing an automatically variable resistance to calibrate the gain circuit is operable to set a gain of the gain circuit at a first level below the clamping amplitude during a calibration mode of the ring laser gyroscope and at a second level above the clamping amplitude during the operating mode of the ring laser gyroscope.

* * * * *